UNITED STATES PATENT OFFICE.

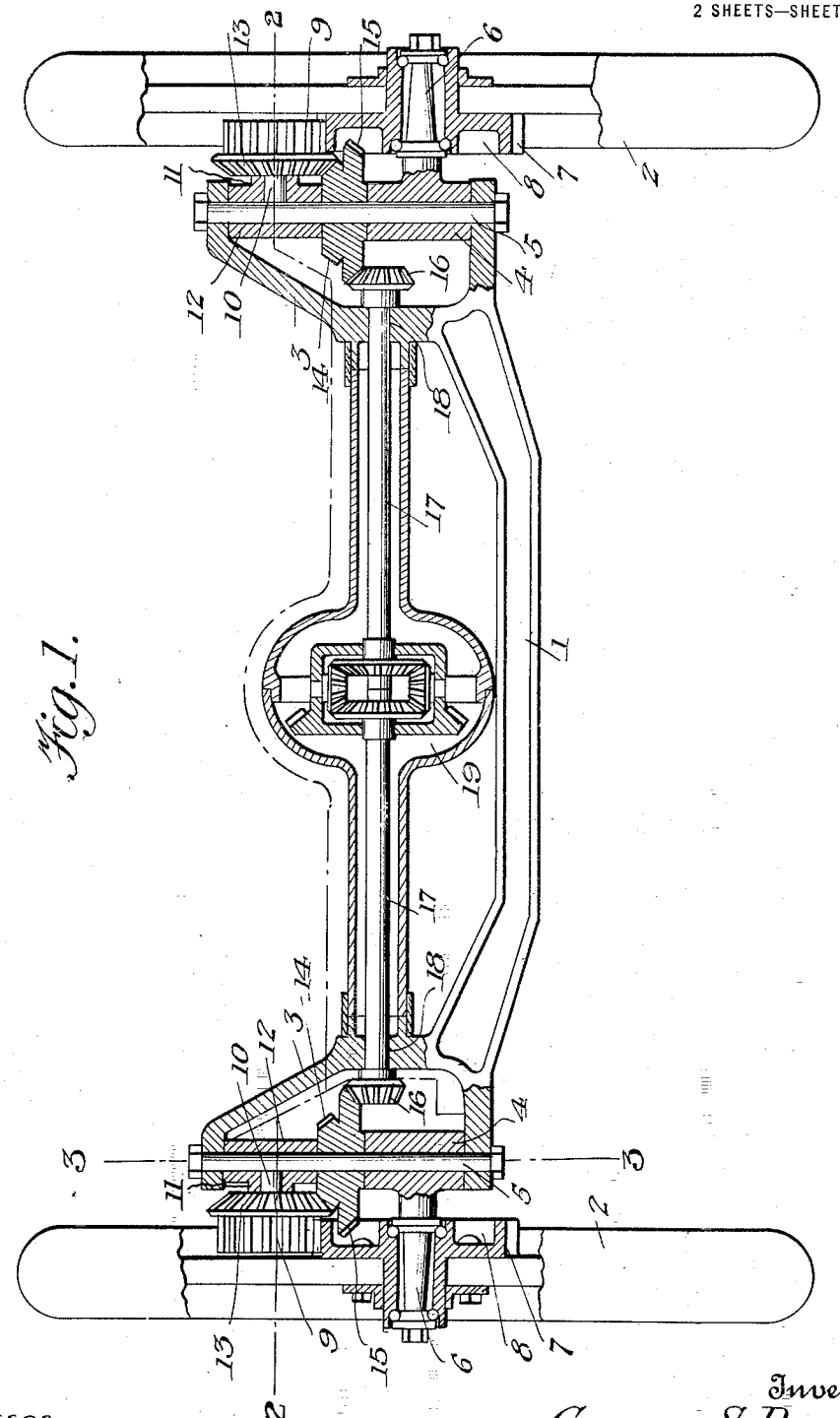

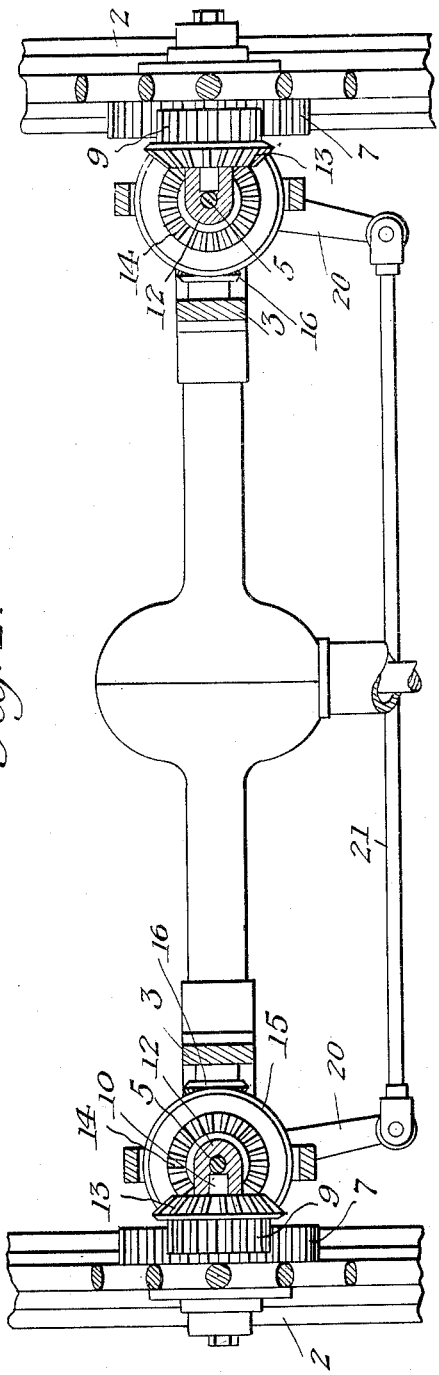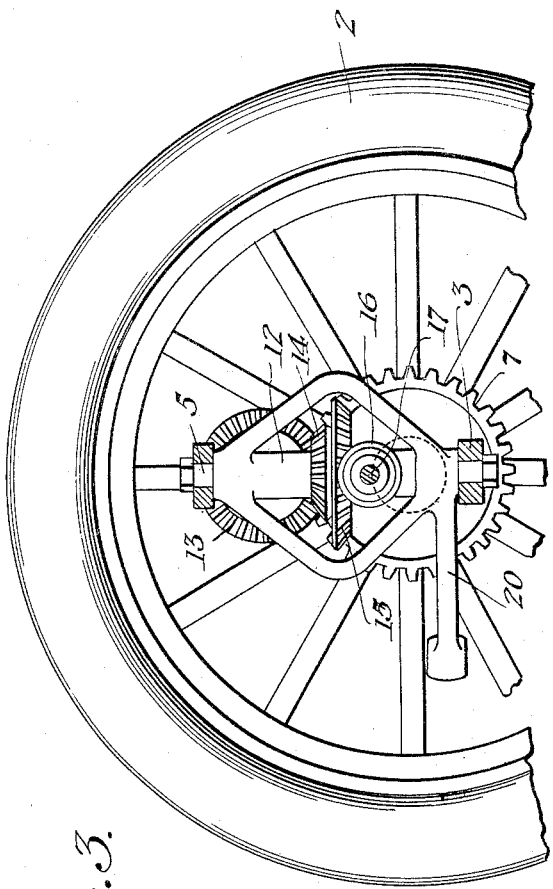

GEORGE S. DUNCAN, OF JEFFERSONVILLE, INDIANA.

FRONT-WHEEL-DRIVE MECHANISM.

1,340,759.     Specification of Letters Patent.     Patented May 18, 1920.

Application filed August 10, 1918. Serial No. 249,350.

*To all whom it may concern:*

Be it known that I, GEORGE S. DUNCAN, a citizen of the United States, residing at Jeffersonville, in the county of Clark and State of Indiana, have invented new and useful Improvements in Front-Wheel-Drive Mechanism, of which the following is a specification.

This invention relates to front wheel drive mechanism, the object in view being to provide simple and effective mechanism for transmitting the power of the engine of a motor vehicle to the front or steering wheels of the vehicle as well as and in addition to the rear wheels.

By means of the improved construction, power is distributed on all four of the vehicle wheels, all four of which become traction wheels. This distribution of the power results in imparting to the vehicle smaller and more powerful action and also results in less wear and tear on the vehicle including the tires and all working parts of the mechanism of the vehicle. It also adds to the hill climbing ability of the machine in connection with which the improved driving mechanism is employed.

With the above and other objects in view, the invention consists in the construction, combination and arrangement of parts, as herein described, illustrated and claimed.

In the accompanying drawings:

Figure 1 is a vertical sectional view taken transversely of a motor vehicle and showing the improved front wheel driving mechanism.

Fig. 2 is a horizontal section of the same.

Fig. 3 is a vertical section taken at a right angle to Figs. 1 and 2.

Referring to the drawings, 1 designates the front axle of a motor vehicle, and 2 the front or steering wheels thereof. The axle 1 is provided at the opposite ends thereof with knuckle carrying forks 3 in which the steering wheel knuckles 4 are mounted to turn on vertical axes, each knuckle 4 being secured within the respective fork 3 by means of a vertical pivot shaft 5. Each knuckle carries one of the steering wheel spindles 6 upon which the adjacent steering wheel is mounted for rotative movement.

In carrying out the present invention, I provide each of the wheels 2 with a spur gear face 7 and also with an annular clearance channel 8, the purpose of which will presently appear. 9 designates a spur pinion which is located at the top of the gear face 7 and meshes with the latter. The pinion 9 is fast on a short transverse shaft 10, the inner end of which is journaled in a bearing 11 in a sleeve 12 surrounding the pivot shaft 5. Fast on the same shaft 10 is a bevel gear 13 which meshes with the smaller bevel face 14 of a double faced gear, embodying also another reversely facing bevel face 15, the latter meshing with and being driven by a bevel pinion 16 on the adjacent section of a front wheel driving shaft 17, the latter being journaled in bearings 18 in the knuckle holding forks 3 above referred to. The sections of the shaft 17 are connected by the well known type of differential gearing 19 now in common use, thus providing for differential rotative movement of the wheels 2 which is necessary in steering the machine and following a curved path.

The gear arrangement at both ends of the front axle 1 is the same as shown by Fig. 1. Each of the steering knuckles has an arm 20 and the arms of the two knuckles are coupled together by the usual connecting rod 21 controlled by the usual steering mechanism of the vehicle. It will be observed that the double faced gear 14, 15 turns on the same vertical axis as the steering knuckle, and therefore the driving gears are not interfered with, no matter at what angle the steering wheel is turned. The driving mechanism for the rear wheels has not been illustrated in the accompanying drawings, as it will be the same as now commonly employed in all motor vehicles.

I claim:—

In front wheel driving mechanism, the combination with the front axle having knuckle holding forks at opposite ends thereof, and steering wheel knuckles mounted in said forks to turn on substantially vertical axes, a front wheel driving shaft located above and in parallel relation to the front axle and having the end portions thereof journaled in said knuckle holding forks, bevel pinions fast on the opposite ends of said shaft, double faced bevel gears rotatable on vertical axes around the pivot shafts of the knuckles and actuated by said bevel pinions on the driving shaft, other bevel gears meshing with said double faced bevel gear and having their shafts journaled in bearings supported by the pivot shafts of the knuckles, spur pinions fast on the shafts of the last named bevel gears, and spur gear faces on the hubs of the steering wheels meshing with and driven by said spur pinions, the hubs of the steering wheels being formed in their inner faces with annular clearance channels for the double faced bevel gear.

In testimony whereof I affix my signature.

GEORGE S. DUNCAN.